Aug. 27, 1940.  E. SCHWARTZ  2,213,077
TRANSPARENT PROJECTION SCREEN
Filed Dec. 16, 1937
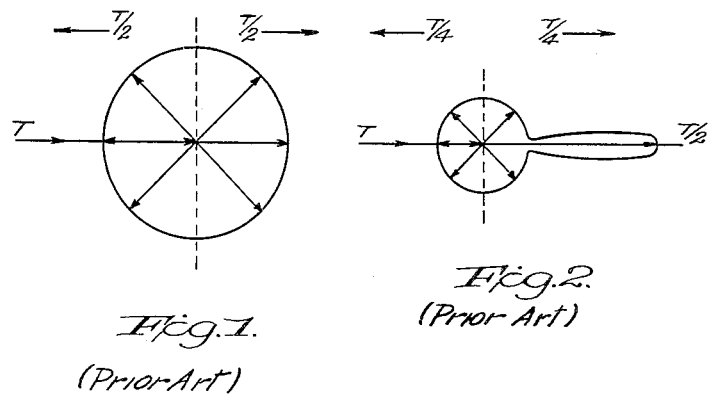
Fig.1.
(Prior Art)
Fig.2.
(Prior Art)
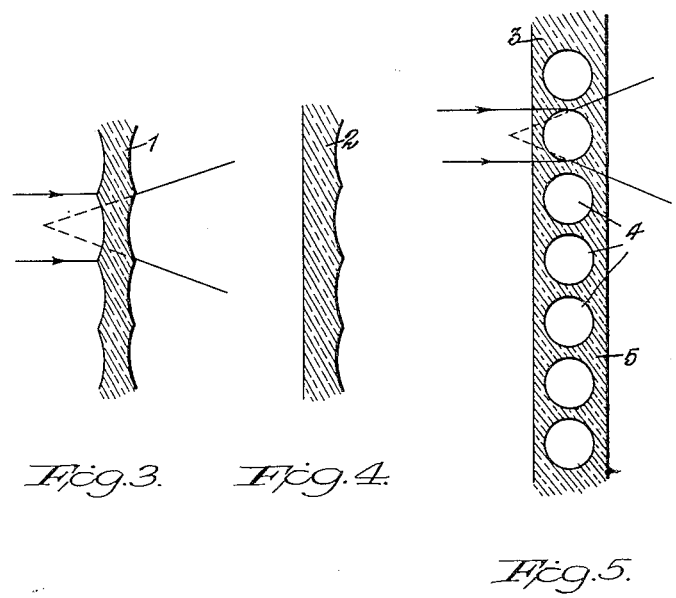
Fig.3.   Fig.4.
Fig.5.
Erich Schwartz  Inventor
By Lippincott & Metcalf  Attorney Patented Aug. 27, 1940

2,213,077

UNITED STATES PATENT OFFICE 2,213,077

TRANSPARENT PROJECTION SCREEN

Erich Schwartz, Berlin-Lichterfelde, Germany, assignor to the firm of Fernseh Aktiengesellschaft, Zehlendorf, near Berlin, Germany Application December 16, 1937, Serial No. 180,233
In Germany January 2, 1937

2 Claims. (Cl. 88—24)

In every type of projection, be it projection of diapositives, moving picture projection, or projection of television images, the method using a non-transparent screen has so far always been superior to the method using transparent screens, as far as light efficiency is concerned, because a light-dispersing, non-transparent screen offers the possibility of reflecting the entire stream of light back into the space wherein the observers are located. In the case of a light-dispersing transparent screen, one-half of the energy goes into that portion of the space where no viewers are located. These conditions are shown in Fig. 1, where a beam of light T is incident from the left, whereby one-half the light is distributed to the front side of the screen and the other half to the back side of the screen.

Screens are known which were intended to avoid these defects. It has been tried to obtain a directional effect by projection upon a layer rendering less than 100% dispersion. Fig. 2 shows the light distribution for a screen of 50% dispersion. Only one-quarter T/4 of the entire energy T is lost, but the radiation characteristic is a Lambert cosine distribution upon which a sharp maximum T/2 is superimposed. This maximum offers the possibility of directly viewing the light source, which is highly disturbing. The disadvantage of this method is that the light, after passing through the screen, is partly dispersed and partly not.

It is the object of the invention to provide a transparent screen for projection which allows efficient use of the entire incident light stream for uniform dispersion and, furthermore, permits the light stream to be concentrated into a certain space angle. According to the invention, the projection screen consists of a screen of negative or diverging lenses. No use at all is made of a light-dispersing layer. In a screen, as above mentioned, the loss of light due to deflection is negligible. Practically the entire stream of light enters into the observation space. Such a screen has the additional advantage that the light passing into the observation space does not follow the Lambert distribution, but may be concentrated into a predetermined space angle. The directional effect of the screen can be increased, if desired, by increasing the focal length of the diverging lenses. For an infinitely small focal length each lens radiates into a space angle of 180 degrees, whereby the difference between such a lens and a light-dispersing layer is such that the lens radiates light only to one side. In order to obtain a constant directional effect over the entire area of the screen, it is desirable that all the diverging lenses have the same focal length.

In the drawing, Figs. 1 and 2 indicate the character of light distribution by a screen of the prior art wherein only half the projected light is transmitted in the one case and wherein a directional effect is introduced in the second case. These two figures have previously been discussed. Figs. 3–5 show embodiments of the present invention. The practical construction of a biconcave screen 1, according to Fig. 3, can be difficult. In its place a plane-concave screen 2 as shown in Fig. 4 may also be used, which screen is made by a method similar to that used in the production of lens screens for colored moving pictures. A third and entirely different method is also possible. Fig. 5 shows a projection screen 3 which is an optical analogy of Fig. 3, but is made entirely differently. A plane screen of small spheres 4 is imbedded in a plane parallel layer 5, whereby the index of refraction of the layer 5 is greater than the of the spheres 4. It is conceivable to make use of a multitude of small air spaces in an optically refractive medium. Although these spheres 4 have biconvex refracting surfaces, they behave like diverging lenses and fulfill the same purpose as the screen 1 of Fig. 3. By suitable choice of the diameter of the spheres 4 and the index of refraction of the layer 5, the focal length of the elemental lenses and, therewith, the directional effect, can be predetermined.

A particularly simple method of making a screen, as shown in Fig. 5, comprises the steps of conveying air bubbles into the melt of a light refractive medium, to cause these bubbles to rise into a plane and to congeal the melt. By separating the plane portion of the congealed melt containing the bubbles, the described screen is obtained.

Projecting screens, according to the invention, are, of course, applicable to all branches of the projection art. Their main application, however, may be in the art of television because the diameters of the elemental diverging lenses may be made comparatively large in view of the finite size of the elements of a television image.

Having thus described my invention, I claim:

1. The method of producing a projection screen which comprises introducing into a melt of glass-like material, a plurality of spherical light-transmitting elements having an optical density lower than that of said glass-like material, causing said spherical light transmitting elements to rise into a common plane, and congealing said melt about said lower density spherical elements.

2. The method of producing a projection screen which comprises introducing into a melt of light-refracting material, a plurality of spherical light-transmitting elements having an optical density lower than that of said light-refracting material, causing said spherical light-transmitting elements to rise into a common plane, congealing said melt about said lower optical density spherical elements and separating from said congealed melt a layer including said spherical light-transmitting elements.

ERICH SCHWARTZ.